United States Patent [19]

Chao

[11] Patent Number: 5,748,574

[45] Date of Patent: May 5, 1998

[54] DOUBLE FOCAL-POINT MAGNETO-OPTIC PICK-UP HEAD

[75] Inventor: Zu-Wen Chao, Shinchu, Taiwan

[73] Assignee: Industrial Technology Research Institute, Taiwan

[21] Appl. No.: 843,471

[22] Filed: Apr. 16, 1997

[30] Foreign Application Priority Data

Dec. 10, 1996 [TW] Taiwan ................................ 85115284

[51] Int. Cl.⁶ ..................................................... G11B 7/00
[52] U.S. Cl. ......................... 369/13; 369/112; 369/109
[58] Field of Search ............................ 369/13, 112, 109, 369/118, 117, 44.37, 44.38, 44.14

[56] References Cited

U.S. PATENT DOCUMENTS

| | | | |
|---|---|---|---|
| 5,270,987 | 12/1993 | Kaku et al. | 369/13 |
| 5,570,334 | 10/1996 | Kim | 369/112 |
| 5,663,940 | 9/1997 | Horimai et al. | 369/112 |
| 5,684,762 | 11/1997 | Kubo | 369/13 |

*Primary Examiner*—Tan Dinh

*Attorney, Agent, or Firm*—Finnegan, Henderson, Farabow, Garrett & Dunner, L.L.P.

[57] ABSTRACT

A double focal-point magneto-optic pick-up head is provided. This magneto-optic pick-up head reads data from an optical disc by using a diffraction grating to diffract a laser beam into two diffracted beams of equal intensity which are focused on the optical disc at two focal points. One focal point is pinpointed on one groove portion of the optical disc, and the other focal point is pinpointed on one neighboring land portion of the same. This allows the two reflected beams to have a difference in propagation length equal to twice the depth of the land portion. The reflected beams are subsequently diffracted again by the diffraction grating into four beams, two of which are directed to interfere with each other to thereby produce an interference beam representative of a read signal from the optical disc. Since the depth is fixed by manufacture, the difference in propagation length between the two reflected beams from the two focal points on the optical disc can always be maintained at a constant. The interference between the two beams for the read signal is thus precise, allowing the output data from the magneto-optic pick-up head to be reliable.

10 Claims, 3 Drawing Sheets

DOUBLE FOCAL-POINT MAGNETO-OPTIC PICK-UP HEAD

BACKGROUND OF THE INVENTION

1. Field of the Invention

This invention relates to magneto-optic pick-up heads, and more particularly, to a double focal-point magneto-optic pick-up head which includes a featured grating in place of a beam splitter in conventional magneto-optic pick-up heads for diffracting a laser beam into two beams which are focused on the optical disc at two focal points such that the data read operation is more reliable.

2. Description of Related Art

Optical discs have the advantages of high data storage capacity, durable in structure, long life of use, low manufacturing cost, and reliable data storage capability. Due to these reasons, the optical discs are replacing the magnetic storage media, such as magnetic disks, as the main mass data storage medium in the present information age. The data on an optical disc can be read out by a magneto-optic pick-up head.

FIG. 1 is a schematic diagram of a conventional magneto-optic pick-up head which reads data from an optical disc 14 by focusing a laser beam on the disk at only one focal point A. As shown, this magneto-optic pick-up head includes a laser source 10 for generating a linearly polarized laser beam. A λ/4 plate 11 is mounted on the optical path of the laser beam from the laser source 10 for transforming the linearly polarized laser beam from the laser source 10 into a circularly polarized one.

A polarization beam splitter 12 subsequently divides the laser beam from the λ/4 plate 11 into two beams: a first laser beam passing through the polarization beam splitter 12 to a focusing lens 13 and a second laser beam reflected by the same. The second laser beam serves a reference beam.

The focusing lens 13 then focus the first light beam on a focal point A on the optical disc 14. A magnetic means is mounted on the opposite side of the optical disc 14 for providing the so-called magneto-optical effect to the laser beam by which the plane of polarization of the laser beam is rotated. The magneto-optic effect is a well-known technique so that description thereof will not be further detailed. The reflected laser beam from the optical disc 14 is again divided by the polarization beam splitter 12 into two beams: a third laser beam passing through the polarization beam splitter 12, and a fourth laser beam reflected by the same.

The third laser beam subsequently passes through the λ/4 plate 11 to be thereby transformed back to a linearly polarized beam. However, since the polarization direction of this beam is different from the laser beam just emitted from the laser source 10, the third laser beam will not affect the quality of the emitted laser beam.

On the other hand, the fourth laser beam serves as a signal beam which produces a magneto-optic signal representative of the data being read from the optical disc 14. Optical sensing means 15 are used to convert the magneto-optic signal into corresponding electrical signal which can be processed by subsequent hardware circuits (not shown) to obtain the data.

The foregoing magneto-optic pick-up head is based on the interference of two laser beams to obtain the magneto-optic signals representative of the data being read from the optical disc. One drawback to this magneto-optic pick-up head, however, is that the optical system should be designed in such a manner as to provide a precise difference in the propagation length between the signal beam (the fourth laser beam) and the reference beam (the second laser beam). If the difference in propagation length between the signal beam and the reference beam is not maintained at a constant, the interference effect between the same will be affected. As a bad consequence of this, the data being obtained can be unreliable.

SUMMARY OF THE INVENTION

It is therefore a primary objective of the present invention to provide a double focal-point magneto-optic pick-up head which reads data from an optical disc by using a featured diffraction grating instead of the polarization beam splitter such that the difference in propagation length between the signal beam and the reference beam can be substantially always maintained at a constant so as to obtain reliable data output.

In accordance with the foregoing and other objectives of the present invention, an improved magneto-optic pick-up head is provided. This magneto-optic pick-up head includes a laser means, such as a laser diode, for generating a laser beam which is linearly polarized. Collimating lens means is subsequently used to collimate the laser beam from the laser means into parallel rays. A polarization beam splitter is then used to reflect the laser beam from the collimating lens means to a first propagation path, and a λ/4 plate is used to transform the laser beam from the polarization beam splitter into a circularly polarized laser beam. Subsequently, a diffraction grating is used to diffract the circularly polarized laser beam from the λ/4 plate into a first diffracted beam and a second diffracted beam which are subsequently focused by first light focusing means onto the optical disc.

The first diffracted beam is focused on one groove portion of the optical disc subjected to a magneto-optic effect, and the second diffracted beam is focused on one land portion of the optical disc not subjected to the magneto-optic effect. Due to a depth of the groove portion relative to the land portion, which is typically a fixed value of λ/8 by manufacture, the difference in propagation length between the reflected beams of the first and second diffracted beams is λ/4. These reflected beams then propagates in the reverse direction from the optical disc to pass through the first light focusing means to the diffraction grating.

At the diffraction grating, the reflected beam of the first diffracted beam is diffracted into a first signal beam and a second signal beam, and the reflected beam of the second diffracted beam is diffracted into a third signal beam and a fourth signal beam. The first signal represents a focusing-error signal beam, and the fourth signal represents a tracking-error signal beam. Further, the second and third signal beams are combined into an interference read signal beam. The read signal beam, the focusing-error signal beam, and the tracking-error signal beam then propagate through the λ/4 plate to the polarization beam splitter.

Second light focusing means is optically coupled to the polarization beam splitter for focusing the read signal beam, the focusing-error signal beam, and the tracking-error signal onto a first spot, a second spot, and a third spot respectively. First optical sensing means is mounted on the first spot for generating a first electrical signal proportional to the intensity of the interference signal beam; second optical sensing means is mounted on the second spot for generating a second electrical signal proportional to the intensity of the focusing error signal beam; and third optical sensing means is mounted on the third spot for generating a third electrical signal proportional to the intensity of the tracking error signal beam. These electrical signals are then processed by other hardware circuits for control of the optical disc and to obtain the data.

The foregoing magneto-optic pick-up head of the invention allows the two reflected beams from the two focal points on the optical disc to have a constant difference in propagation length. The interference between the two beams is thus precise, allowing the output data from the magneto-optic pick-up head to be reliable.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

Figure 1:
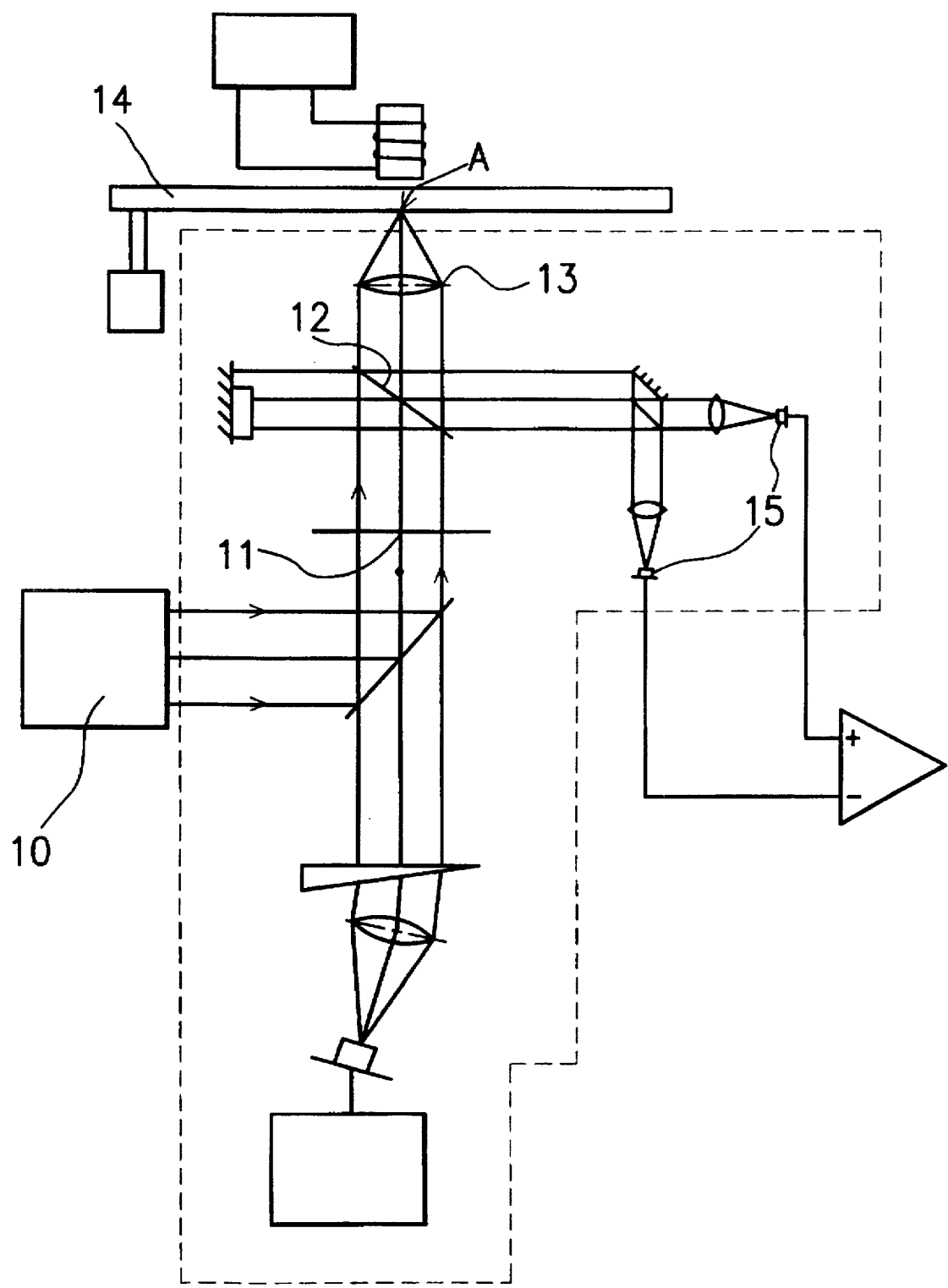
FIG. 1 is a schematic diagram of a conventional magneto-optic pick-up head.

The magneto-optic pick-up head of the invention is based on the generation of two diffracted beams which are focused on the optical disc at two focal points, one on a groove portion of the optical disc subjected to a magneto-optic effect and the other on a land portion of the optical disc not subjected to the magneto-optic effect. This can allow the difference in propagation length between the reflected beams from the two focal points to be substantially always maintained at a constant. This principle will be described in detail in the following.

An optical disc has a data surface which is formed with a plurality of groove portions which represent the digital data stored thereon. The land portion of the optical disc is kept blank. In accordance with the invention, two beams A, B equal in intensity are produced to be focused onto the optical disc at two focal points, one being pinpointed on a groove portion and the other being pinpointed on a land portion of the optical disc. Before being focused on the optical disc, these two beams are equal in propagation length L and phase angle $\omega \cdot t + kL$, where $k = 2\pi/\lambda$ and $\lambda$ is the wavelength of these two beams.

The first beam A is focused on a groove portion of the optical disc where the beam A will be subjected to a magneto-optic effect to be rotated in polarization direction by one Kerr angle $\theta_k$. The reflected beam A can thus be expressed as follows:

$$A = exp[i \cdot (\omega \cdot t + \theta_k + k \cdot 2 \cdot L)]$$

The other beam B is focused on one neighboring land portion of the optical disc where the beam B will not be subjected to the magneto-optic effect so that its polarization plane will remain unchanged. However, due to the depth $\Delta$ of the land portion relative to the groove portion, the propagation length of the reflected beam B will be greater than that of the reflected beam A by twice the depth $\Delta$. By the present standard, $\Delta = \lambda/8$. Therefore, the propagation length of the reflected beam B will be greater than that of the reflected beam A by $2\Delta = \lambda/4$. The reflected beam B can be expressed as follows:

$$B = exp[i \cdot (\omega \cdot t + k \cdot 2 \cdot L + k \cdot 2 \cdot \Delta)]$$
$$= exp[i \cdot (\omega \cdot t + k \cdot 2 \cdot L + \pi/2)]$$

In accordance with the invention, these two reflected beams A and B are directed to interfere with each other to produce an interference beam C, where $$C = A + B$$
$$= exp(i \cdot \omega \cdot t + i \cdot k \cdot 2 \cdot L)[exp(i \cdot \theta_k) + exp(i \cdot \pi/2)]$$

The intensity I of the interference beam C can be derived as follows:

$$\begin{aligned} I &= C \cdot C^* \\ &= [exp(i \cdot \theta_k) + exp(i \cdot \pi/2)] \cdot [exp(-i \cdot \theta_k) + exp(-i \cdot \pi/2)] \\ &= 2 + 2 \cdot cos(\theta_k - \pi/2) \\ &= 2 + 2 \cdot sin(\theta_k) \\ &= 2 + 2 \cdot \theta_k \end{aligned} \qquad (1)$$

The DC component of I is 2 and the AC component of the same is $2 \cdot \theta_k$.

Optical sensing means can be used to convert the interference beam C into an electrical signal with an AC component proportional to $2 \cdot \theta_k$. Since the amplitude of the electrical signal is proportional to the intensity of the beam, the amplitude of the read signal, represented by RS, is proportional to the AC component of the output of the optical sensing means, i.e., $$RS \approx 2 \cdot \theta_k \qquad (2)$$

Since $\Delta$ is a fixed value by manufacture, the interference beam C can be stably produced with a fixed intensity I, allowing the read signal RS to be stable. The output data from the magneto-optic pick-up head is thus reliable.

Based on the foregoing principle, two preferred embodiments of the double focal-point magneto-optic pick-up head of the invention are disclosed, which will be described respectively in full detail in the following.

First Preferred Embodiment

In accordance with the first preferred embodiment of the invention, a double focal-point magneto-optic pick-up head is devised and described in full detail in the following with reference to FIG. 2.

Figure 2:
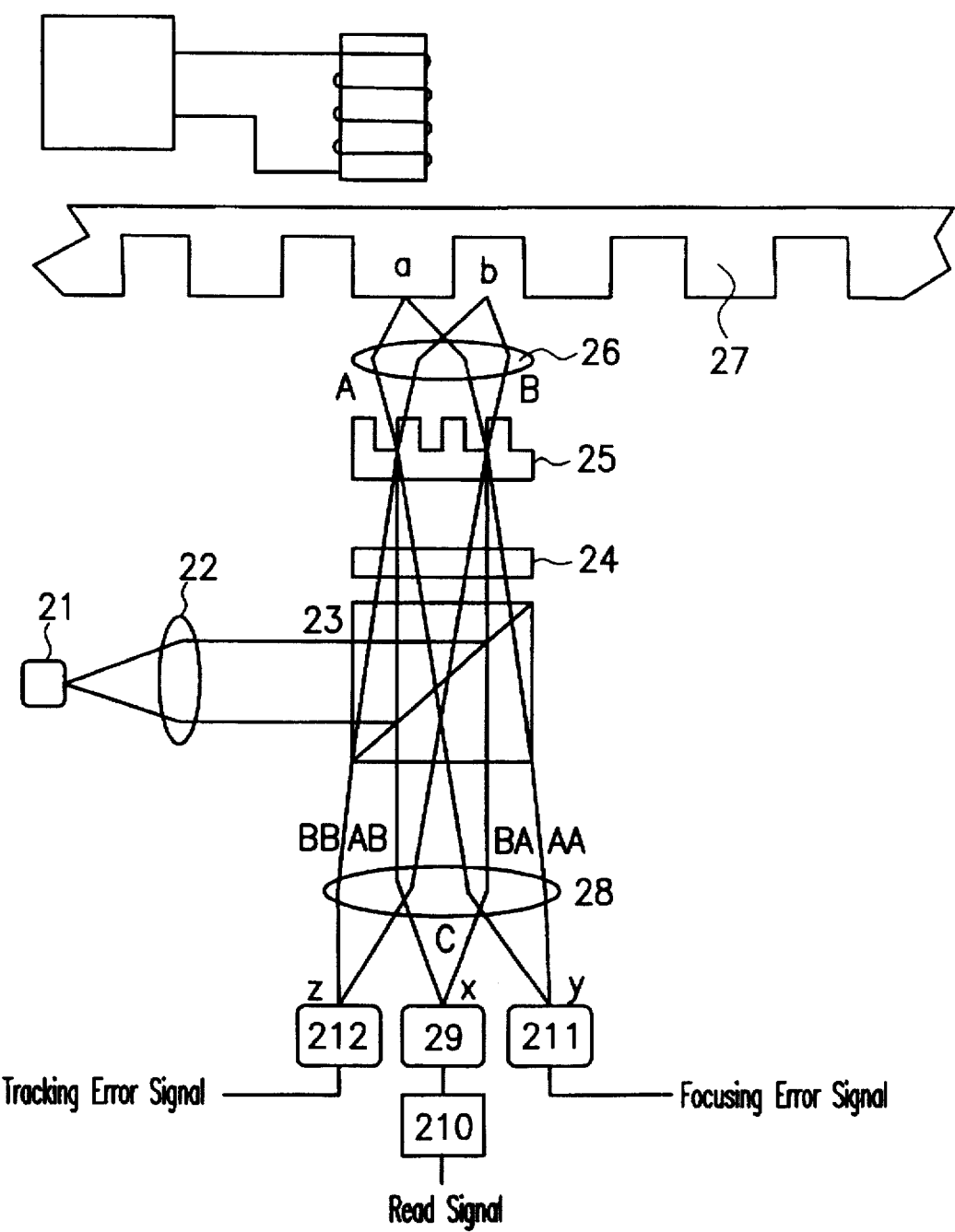
FIG. 2 is a schematic diagram of a first preferred embodiment of the double focal-point magneto-optic pick-up head according to the present invention.

Referring to FIG. 2, there is shown a double focal-point magneto-optic pick-up head configured in accordance with the present invention. This magneto-optic pick-up head includes a laser diode 21, a collimating lens 22, a polarization beam splitter 23, a $\lambda/4$ plate 24, a diffraction grating 25, and a first focusing lens 26. Further, the magneto-optic pick-up head includes a second focusing lens 28, a group of optical sensors including a first optical sensor 29, a second optical sensor 211, and a third optical sensor 212. A filter 210 is coupled to the output of the second optical sensor 29.

The laser diode 21 generates a linear P-polarization laser beam which is then collimated by the collimating lens 22 into parallel rays. The collimated laser beam is then reflected by the polarization beam splitter 23 sidewards to the $\lambda/4$ plate 24. Passing through the $\lambda/4$ plate 24, the linearly polarized laser beam is transformed into a circularly polarized one. Subsequently, the circularly polarized laser beam is diffracted by the diffraction grating 25 into a first diffracted beam A and a second diffracted beam B. This diffraction grating 25 could be formed with any repeating geometrical structures, for example, closely spaced parallel bars. The first and second diffracted beams A, B are then focused by the first focusing lens 26 onto two focal points a, b on the data surface of the optical disc 27. The first focal point a is pinpointed on one groove portion of the optical disc 27 and the second focal point b is pinpointed on one neighboring land portion of the same.

The first and second diffracted beams A, B are then reflected back from the optical disc 27 and pass through the first focusing lens 26 to the diffraction grating 25. At the diffraction grating 25, the reflected beam of A is diffracted into two beams AA and AB, and the reflected beam of B is diffracted into two beams BA and BB. These beams AA, AB, BA, and BB then pass through the $\lambda/4$ plate 24 and the polarization beam splitter 23 to the second focusing lens 28. After passing through the $\lambda/4$ plate 24, these beams AA, AB, BA, and BB are transformed into S-polarization beams. Further, the two beams AB and BA are directed to interfere with each other to form an interference beam C having an intensity of I as expressed in Eq. (1).

The beam C is then focused by the second focusing lens 28 onto a spot x where the first optical sensor 29 is mounted; the beam AA is focused by the same onto a spot y where the second optical sensor 211 is mounted; and the beam BB is focused by the same onto a spot z where the third optical sensor 212 is mounted.

The output of the first optical sensor 29 is then processed by the filter 210 to produce an output representative of the read signal RS as given in Eq.(2). Further, the output of the second optical sensor 211 is an electrical signal representative of a focusing error signal, and the output of the third optical sensor 212 is an electrical signal representative of a tracking error signal. The significance of these signals are well-known to those skilled in the art so that description thereof will not be further detailed.

Second Preferred Embodiment

Figure 3:
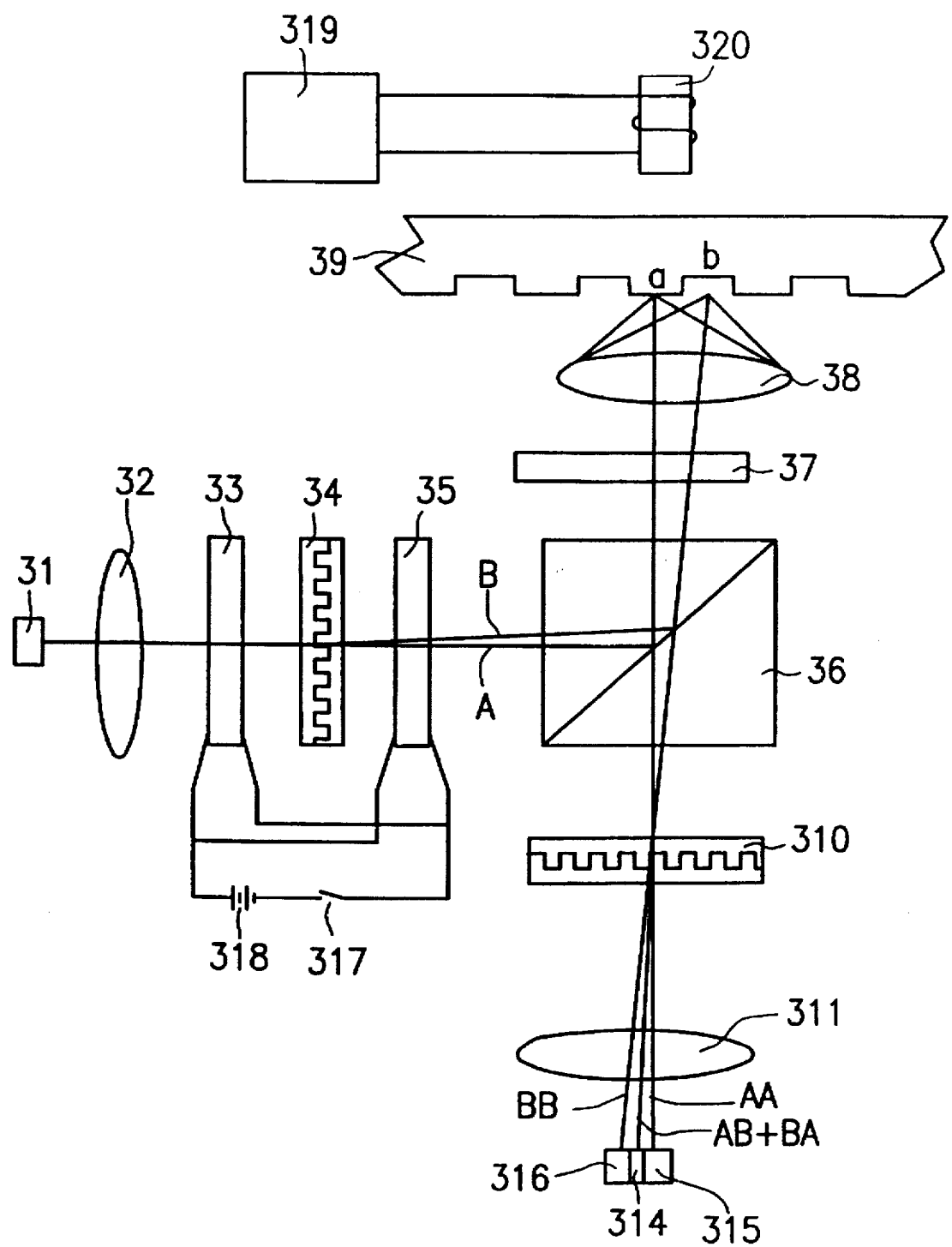
FIG. 3 is a schematic diagram of a second preferred embodiment of the double focal-point magneto-optic pick-up head according to the present invention.

In accordance with the second preferred embodiment of the invention, a double focal-point magneto-optic pick-up head is devised and described in full detail in the following with reference to FIG. 3.

The same constituent parts of this embodiment as the previous one include a laser diode 31, a collimating lens 32, a polarization beam splitter 36, a $\lambda/4$ plate 37, a first focusing lens 38, a second focusing lens 311, and a set of optical sensors 315, 316, 317. This embodiment differs from the previous one in that this embodiment includes a first liquid crystal polarizer 33, a first polarizing grating 34, a second liquid crystal polarizer 35 which are arranged between the collimating lens 32 and the second liquid crystal polarizer 35, and a second polarizing diffraction grating 310 arranged between the polarization beam splitter 36 and the second focusing lens 311. Further, the first and second liquid crystal polarizers 33, 35 are connected to a power source, such as a battery unit 318, via a switch 317.

In read operation, the switch 317 is switched to an open-circuited state so as to disconnect the delivery of the power from the battery unit 318 to the first and second liquid crystal polarizers 33, 35. This allows the first and second liquid crystal polarizers 33, 35 to transform an S-polarization laser beam passing therethrough to a P-polarization laser beam. When the laser diode 31 produces an S-polarization laser beam, it passes through the collimating lens 32 to the first liquid crystal polarizer 33 where the S-polarization laser beam is transformed into a P-polarization laser beam. Onwards, the P-polarization laser beam from the first liquid crystal polarizer 33 propagates to the first polarizing diffraction grating 34. The first polarizing diffraction grating 34a is formed with a plurality of parallel and equally spaced bars having empty spaces therebetween that allow light to pass therethrough. At the polarizing diffraction grating 34, the beam of P-polarization from the first liquid crystal polarizer 33 is diffracted into a number of diffracted beams of different orders. Among these diffracted beams, only the 0-order beam and the 1st-order beam, as respectively designated by the reference numerals A and B in FIG. 3, are significant in intensity, while all the other orders of beams are nearly zero in intensity and thus can be neglected. Subsequently, the two beams A and B propagate to the second liquid crystal polarizer 35 where they are transformed back to S-polarization laser beams.

Onwards, the S-polarization laser beams A and B propagate to the polarization beam splitter 36 where they are diverted upwards and subsequently propagate to the $\lambda/4$ plate 37. At the $\lambda/4$ plate 37, the two S-polarization laser beams A and B are transformed into circular-polarization beams. The beams from the $\lambda/4$ plate 37 are subsequently focused by the first focusing lens 38 onto the data surface of the optical disc 39. The beam A is focused on a first spot a on the groove area of the optical disc 39 while the beam B is focused on a second spot b on the land area of the same.

The reflected beam from the spot a is a data-signal beam, while the reflected beam from the spot b is a reference-signal beam. These two reflected beams return to and pass through the first focusing lens 38 to the $\lambda/4$ plate 37 where they are transformed into P-polarization laser beams. Subsequently, the P-polarization laser beams from the $\lambda/4$ plate 37 propagate to the polarization beam splitter 36 where they are transmitted to the opposite side of the polarization beam splitter 36. The two beams exiting from the opposite side of the polarization beam splitter 36 subsequently propagate to the second polarizing diffraction grating 310 where they are diffracted into four beams. The beam A is diffracted into two beams AA and AB, while the beam B is diffracted into two beams BA and BB.

The beam AB and the beam BA are subjected to interference and thereby combined into a read-signal beam which is subsequently focused by the second focusing lens 311 onto the optical sensor 314. The beam AA represents a focusing and tracking error signal which is focused by the second focusing lens 311 onto the optical sensor 315. The beam BB represents a light-intensity monitoring signal which is focused by the second focusing lens 311 onto the optical sensor 316.

In the write operation, the switch 317 is switched to a closed-circuited state so as to connect the power from the battery unit 318 to the first and second liquid crystal polarizers 33, 35. This makes the first and second liquid crystal polarizers 33, 35 not able to transform the S-polarization laser beam into P-polarization laser beam. When the laser diode 31 produces an S-polarization laser beam, it passes successively through the collimating lens 32, the first liquid crystal polarizer 33, the first polarizing diffraction grating 34, and the second liquid crystal polarizer 35 without being subjected to diffraction and transformation in polarization. Therefore, after exiting from the second liquid crystal polarizer 35, the original S-polarization laser beam remains one single beam which is still in S-polarization condition.

Onwards, the beam from the second liquid crystal polarizer 35 propagates to the polarization beam splitter 36 where it is diverted upwards and subsequently propagates to the $\lambda/4$ plate 37. At the $\lambda/4$ plate 37, the beam is transformed into a circular-polarization beam. The beam passing through the $\lambda/4$ plate 37 is subsequently focused by the first focusing lens 38 onto a spot a on the current groove area of the optical disc 39. This causes the spot a to raise in temperature. Meanwhile, the signal generator 319 produces a current signal to the electro-magnet 320 so as to build a magnetic field either in the upward direction or in the downward direction depending on whether the current data to be written onto the optical disc 39 is 0 or 1.

After the data is written onto the optical disc 39, the reflected beam from the spot a returns to and passes through the first focusing lens 38 to the λ/4 plate 37 where it is transformed into a P-polarization laser beam. After this, the beam from the λ/4 plate 37 passes through the polarization beam splitter 36 to the second polarizing diffraction grating 310 where it is diffracted into two beams AA and AB. The beam AA represents a focusing and tracking error signal which is focused by the second focusing lens 311 onto the optical sensor 315. In the case of the write operation, the beam AB is not used so that it is not further processed in any manner.

It can be learned from the foregoing that the invention allows the foregoing magneto-optic pick-up head of the invention allows the two reflected beams from the two focal points on the optical disc to have a constant difference in propagation length. The interference between the two beams is thus precise, allowing the output data from the magneto-optic pick-up head to be reliable.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. A double focal-point magneto-optic pick-up head for reading data from an optical disc having at least one groove portion and one land portion which has a predetermined depth, said double focal-point magneto-optic pick-up head comprising:

laser means for generating a laser beam which is linearly polarized;

collimating lens means, optically coupled to said laser means, for collimating the laser beam generated by said laser means;

a polarization beam splitter, optically coupled to said collimating lens means, for reflecting the laser beam from said collimating lens means to a first propagation path;

a λ/4 plate, optically coupled on said first propagation path, for transforming the laser beam from said polarization beam splitter into a circularly polarized laser beam;

a diffraction grating, optically coupled to said λ/4 plate, for diffracting the circularly polarized laser beam from said λ/4 plate into at least a first diffracted beam and a second diffracted beam;

first light focusing means, optically coupled to said diffraction grating, for focusing said first and second diffracted beams onto the optical disc, said first diffracted beam being focused on a first focal point on the groove portion of the optical disc which is subjected to a magneto-optic effect, and said second diffracted beam being focused on a second focal point on the land portion of the optical disc which is not subjected to the magneto-optic effect, said first and second diffracted beams being subsequently reflected back from the optical disc and passing through said first light focusing means to said diffraction grating where said the reflected beam of said first diffracted beam is diffracted into a first signal beam and a second signal beam and the reflected beam of said second diffracted beam is diffracted into a third signal beam and a fourth signal beam, said first signal representing a focusing-error signal beam, said second and third signal beams being combined into an interference signal beam representative of a read signal beam, and said fourth signal representing a tracking-error signal beam, said read signal beam, focusing-error signal beam, and tracking-error signal beam subsequently passing through said λ/4 plate to said polarization beam splitter;

second light focusing means, optically coupled to said polarization beam splitter on a second propagation path aligned with the first propagation path, for focusing said read signal beam, said focusing-error signal beam, and said tracking-error signal onto a first spot, a second spot, and a third spot respectively;

first optical sensing means, mounted on said first spot, for generating a first electrical signal proportional to the intensity of said read signal beam;

second optical sensing means, mounted on said second spot, for generating a second electrical signal proportional to the intensity of said focusing error signal beam; and third optical sensing means, mounted on said third spot, for generating a third electrical signal proportional to the intensity of said tracking error signal beam.

2. The magneto-optic pick-up head of claim 1, wherein said first and second diffraction gratings are each capable of diffracting the laser beam passing therethrough into a number of diffracted beams of different orders including a 0-order diffracted beam and a 1st-order diffracted beam.

3. The magneto-optic pick-up head of claim 2, wherein said 0-order diffracted beam and said 1st-order diffracted beam are substantially equal in intensity.

4. The magneto-optic pick-up head of claim 1, wherein said diffraction gratings is formed with a plurality of parallel and equally spaced bars having empty spaces therebetween.

5. The magneto-optic pick-up head of claim 1, wherein the optical axis of said collimating lens is perpendicular to the optical axis of said first and second focusing means.

6. The magneto-optic pick-up head of claim 1, wherein the optical axis of said second light focusing means is parallel to the optical axis of said first focusing light focusing means.

7. A double focal-point magneto-optic pick-up head for reading data from an optical disc having at least one groove portion and one land portion which has a predetermined depth, said double focal-point magneto-optic pick-up head comprising:

laser means for generating a laser beam which is linearly polarized;

collimating lens means, optically coupled to said laser means, for collimating the laser beam generated by said laser means;

a first liquid crystal polarizer, optical coupled to said collimating lens means, for transforming the polarization of the laser beam from said laser means;

a first diffraction grating, optically coupled to said first liquid crystal polarizer, for diffracting the laser beam passing through said first liquid crystal polarizer into at least two beams;

a second liquid crystal polarizer, optically coupled to said diffraction grating, for transforming the polarization of the laser beam from said diffraction grating; power means for supplying electrical power to said first and second liquid crystal polarizers, said power means being disconnected from said first and second liquid crystal polarizers in a read operation and connected to said first and second liquid crystal polarizers in a write operation;

a polarization beam splitter, optically coupled to said collimating lens means, for reflecting the laser beam from said collimating lens means to a first propagation path;

a λ/4 plate, optically coupled on said first propagation path, for transforming the laser beam from said polarization beam splitter into a circularly polarized laser beam;

first light focusing means, optically coupled to said diffraction grating, for focusing said first and second diffracted beams onto the optical disc, said first diffracted beam being focused on a first focal point on the groove portion of the optical disc which is subjected to a magneto-optic effect, and said second diffracted beam being focused on a second focal point on the land portion of the optical disc which is not subjected to the magneto-optic effect, said first and second diffracted beams being subsequently reflected back from the optical disc and passing through said first light focusing means to said diffraction grating where said the reflected beam of said first diffracted beam is diffracted into a first signal beam and a second signal beam and the reflected beam of said second diffracted beam is diffracted into a third signal beam and a fourth signal beam, said first signal representing a focusing-error signal beam, said second and third signal beams being combined into an interference signal beam representative of a read signal beam, and said fourth signal representing a tracking-error signal beam, said read signal beam, focusing-error signal beam, and tracking-error signal beam subsequently passing through said λ/4 plate to said polarization beam splitter;

a second diffraction grating, optically coupled to said polarization beam splitter, for diffracting the laser beam from said polarization beam splitter into at least a first diffracted beam and a second diffracted beam;

second light focusing means, optically coupled to said polarization beam splitter on a second propagation path aligned with the first propagation path, for focusing said read signal beam, said focusing-error signal beam, and said tracking-error signal onto a first spot, a second spot, and a third spot respectively;

first optical sensing means, mounted on said first spot, for generating a first electrical signal proportional to the intensity of said read signal beam;

second optical sensing means, mounted on said second spot, for generating a second electrical signal proportional to the intensity of said focusing error signal beam; and third optical sensing means, mounted on said third spot, for generating a third electrical signal proportional to the intensity of said tracking error signal beam.

8. The magneto-optic pick-up head of claim 7, wherein said first and second diffraction gratings are each capable of diffracting the laser beam passing therethrough into a number of diffracted beams of different orders including a 0-order diffracted beam and a 1st-order diffracted beam.

9. The magneto-optic pick-up head of claim 8, wherein said 0-order diffracted beam and said 1st-order diffracted beam are substantially equal in intensity.

10. The magneto-optic pick-up head of claim 7, wherein said first and second diffraction gratings are each formed with a plurality of parallel and equally spaced bars having empty spaces therebetween.

* * * * *